United States Patent
Bangerter (10) Patent No.: US 9,995,157 B2
(45) Date of Patent: Jun. 12, 2018

(54) GAS TURBINE ENGINE TURBINE VANE PLATFORM COOLING

(71) Applicant: United Technologies Corporation, Hartford, CT (US)

(72) Inventor: James P. Bangerter, Manchester, CT (US)

(73) Assignee: UNITED TECHNOLOGIES CORPORATION, Farmington, CT (US)

( * ) Notice: Subject to any disclaimer, the term of this patent is extended or adjusted under 35 U.S.C. 154(b) by 213 days.

(21) Appl. No.: 14/675,824

(22) Filed: Apr. 1, 2015

(65) Prior Publication Data

US 2015/0285086 A1    Oct. 8, 2015

Related U.S. Application Data

(60) Provisional application No. 61/975,265, filed on Apr. 4, 2014.

(51) Int. Cl.
*F01D 9/06* (2006.01)
*F01D 9/02* (2006.01)
(Continued)

(52) U.S. Cl.
CPC ............ *F01D 9/02* (2013.01); *F01D 1/02* (2013.01); *F01D 5/02* (2013.01); *F01D 5/18* (2013.01);
(Continued)

(58) Field of Classification Search
CPC . F01D 9/06; F01D 9/065; F01D 9/041; F01D 25/12; F05D 2240/12; F05D 2240/126; F05D 2240/127; F05D 2240/81; F05D 2260/22141; F05D 2260/201; F05D 2260/2212; F05D 2260/20
(Continued)

(56) References Cited

U.S. PATENT DOCUMENTS 3,800,864 A * 4/1974 Hauser .................. F01D 25/12
                                                        165/186
4,712,979 A   12/1987 Finger
(Continued)

FOREIGN PATENT DOCUMENTS

DE    102005024696    1/2006
EP    2469034         6/2012
(Continued)

OTHER PUBLICATIONS

Machine English translation of DE 10 2005 024 696, Jan. 2006.*
(Continued)

*Primary Examiner* — Christopher Verdier
(74) *Attorney, Agent, or Firm* — Carlson, Gaskey & Olds, P.C.

(57) ABSTRACT

A stator vane for a gas turbine engine includes an airfoil that extends radially from a first side of a platform. A pocket is provided in the platform on a second side opposite the airfoil. Forward and aft rails extend from the second side of the platform. One of the forward and aft rails includes a radial surface. An impingement plate is secured to the platform over the pocket. The impingement plate includes a radial flange that engages the radial surface.

15 Claims, 4 Drawing Sheets

(51) Int. Cl.
*F01D 1/02* (2006.01)
*F01D 5/02* (2006.01)
*F01D 25/12* (2006.01)
*F01D 5/18* (2006.01)
*F01D 9/04* (2006.01)

(52) U.S. Cl.
CPC ............ *F01D 9/041* (2013.01); *F01D 25/12* (2013.01); *F01D 9/065* (2013.01); *F05D 2220/32* (2013.01); *F05D 2230/232* (2013.01); *F05D 2240/12* (2013.01); *F05D 2240/81* (2013.01); *F05D 2260/201* (2013.01); *F05D 2260/2212* (2013.01); *F05D 2260/22141* (2013.01); *Y02T 50/672* (2013.01); *Y02T 50/676* (2013.01)

(58) Field of Classification Search
USPC .................................. 415/115, 116, 176, 178
See application file for complete search history.

(56) References Cited

U.S. PATENT DOCUMENTS

| | | | |
|---|---|---|---|
| 5,413,458 A | 5/1995 | Calderbank | |
| 5,609,466 A | 3/1997 | North et al. | |
| 6,386,825 B1 | 5/2002 | Burdgick | |
| 6,647,624 B2 | 11/2003 | Fried et al. | |
| 8,403,631 B2 | 3/2013 | Surace et al. | |
| 9,500,099 B2* | 11/2016 | Spangler | F01D 25/12 |
| 2010/0266386 A1 | 10/2010 | Brommer et al. | |
| 2012/0020768 A1* | 1/2012 | Krueckels | F01D 5/187 415/1 |
| 2012/0163975 A1* | 6/2012 | Propheter-Hinckley | F01D 11/24 416/95 |
| 2013/0209217 A1* | 8/2013 | Butler | F01D 9/041 415/1 |
| 2014/0000283 A1 | 1/2014 | Spangler et al. | |
| 2015/0275763 A1* | 10/2015 | Kanjiyani | F01D 5/187 415/1 |

FOREIGN PATENT DOCUMENTS

| | | |
|---|---|---|
| EP | 2924238 A1 | 9/2015 |
| GB | 1322801 | 7/1973 |
| JP | H11257003 | 9/1999 |

OTHER PUBLICATIONS

Extended European Search Report for European Patent Application No. 15162139.8, dated Aug. 5, 2015.
European Office Action dated Mar. 23, 2018.

\* cited by examiner

GAS TURBINE ENGINE TURBINE VANE PLATFORM COOLING

CROSS-REFERENCE TO RELATED APPLICATIONS

This application claims priority to U.S. Provisional Application No. 61/975,265, which was filed on Apr. 4, 2014 and is incorporated herein by reference.

BACKGROUND

This disclosure relates to a gas turbine engine, and more particularly, to turbine vane platform cooling arrangements that may be incorporated into a gas turbine engine.

Gas turbine engines typically include a compressor section, a combustor section and a turbine section. During operation, air is pressurized in the compressor section and is mixed with fuel and burned in the combustor section to generate hot combustion gases. The hot combustion gases are communicated through the turbine section, which extracts energy from the hot combustion gases to power the compressor section and other gas turbine engine loads.

Both the compressor and turbine sections may include alternating series of rotating blades and stationary vanes that extend into the core flow path of the gas turbine engine. For example, in the turbine section, turbine blades rotate and extract energy from the hot combustion gases that are communicated along the core flow path of the gas turbine engine. The turbine vanes, which generally do not rotate, guide the airflow and prepare it for the next set of blades.

Some turbine vanes may use an impingement plate secured to an airfoil's platform. The platform has an indented region or pocket over which the plate is secured to form a cooling pocket. Impingement plate and platform pocket designs on gas turbine vanes can limit the amount of platform area that is able to be cooled. One example construction has a cast pocket with a raised shoulder around its entire perimeter. Opposing shoulder portions extend from e spaced apart forward and aft rail, reducing the size of the pocket. The impingement plate is welded to this shoulder. One problem is that the material beneath the shoulder and welded plate is uncooled. Moreover, the combination of tolerances from the sheet metal profile and casting profiles requires that the shoulder be oversized to ensure that there is a minimum overlap between the sheet metal and the shoulder.

SUMMARY

In one exemplary embodiment, a stator vane for a gas turbine engine includes an airfoil that extends radially from a first side of a platform. A pocket is provided in the platform on a second side opposite the airfoil. Forward and aft rails extend from the second side of the platform. One of the forward and aft rails includes a radial surface. An impingement plate is secured to the platform over the pocket. The impingement plate includes a radial flange that engages the radial surface.

In a further embodiment of the above, the pocket is circumscribed by a perimeter. The perimeter is provided by the forward and aft rails. Spaced apart lateral walls join the forward and aft rails.

In a further embodiment of any of the above, a cooling passage extends through the airfoil to the second side. The impingement plate includes an opening aligned with the cooling passage to provide fluid communication there between.

In a further embodiment of any of the above, the second side includes a ridge that circumscribes the cooling passage and engages the impingement plate near the opening.

In a further embodiment of any of the above, the second side includes a recessed wall that adjoins the lateral walls and the other of the forward and aft rails. The impingement plate engages the recessed wall.

In a further embodiment of any of the above, the impingement plate includes lateral flanges that engage the lateral walls.

In a further embodiment of any of the above, the lateral flanges are welded to the lateral walls.

In a further embodiment of any of the above, the radial flange is generally perpendicular to the lateral flanges.

In a further embodiment of any of the above, the impingement plate includes a cooling surface that provides the opening. The cooling surface includes multiple cooling holes facing the second side.

In a further embodiment of any of the above, the second side includes multiple protrusions arranged beneath the multiple cooling holes.

In a further embodiment of any of the above, the radial flange is welded to the radial surface.

In a further embodiment of any of the above, the radial surface is provided on the aft flange.

In a further embodiment of any of the above, the impingement plate is unsupported immediately beneath the radial flange in the radial direction.

In a further embodiment of any of the above, inner and outer platforms are joined by the airfoil. The platform is the outer platform.

In a further embodiment of any of the above, the stator vane is a turbine vane.

In a further embodiment of any of the above, the impingement plate is supported by at least one pedestal near the radial flange in the radial direction.

In another exemplary embodiment, a gas turbine engine includes an engine static structure and compressor and turbine sections. One of the compressor and turbine sections includes a stator vane that is arranged in one of the compressor and turbine sections. An airfoil extends radially from a first side of a platform. A pocket is provided in the platform on a second side opposite the airfoil that is in fluid communication with a cavity provided between the platform and the engine static structure. A cooling passage extends through the airfoil to the second side. Forward and aft rails extend from the second side of the platform. One of the forward and aft rails includes a radial surface. An impingement plate is secured to the platform over the pocket. The impingement plate includes an opening that is aligned with the cooling passage to provide fluid communication between the cavity and the cooling passage. The impingement plate includes a radial flange that engages the radial surface.

In a further embodiment of the above, the pocket is circumscribed by a perimeter. The perimeter is provided by the forward and aft rails. Spaced apart lateral walls join the forward and aft rails. The second side includes a recessed wall that adjoins the lateral walls and the other of the forward and aft rails. The impingement plate engages the recessed wall. The impingement plate includes lateral flanges that engage the lateral walls.

In a further embodiment of any of the above, at least the lateral flanges are welded to the lateral walls or the radial flange is welded to the radial surface.

In a further embodiment of any of the above, the impingement plate is unsupported immediately beneath the radial flange in the radial direction.

In a further embodiment of any of the above, the stator vane is a turbine vane that comprises inner and outer platforms joined by the airfoil. The platform is the outer platform.

In a further embodiment of any of the above, the impingement plate is supported by at least one pedestal near the radial flange in the radial direction.

BRIEF DESCRIPTION OF THE DRAWINGS

The disclosure can be further understood by reference to the following detailed description when considered in connection with the accompanying drawings wherein.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

DETAILED DESCRIPTION

Figure 1:
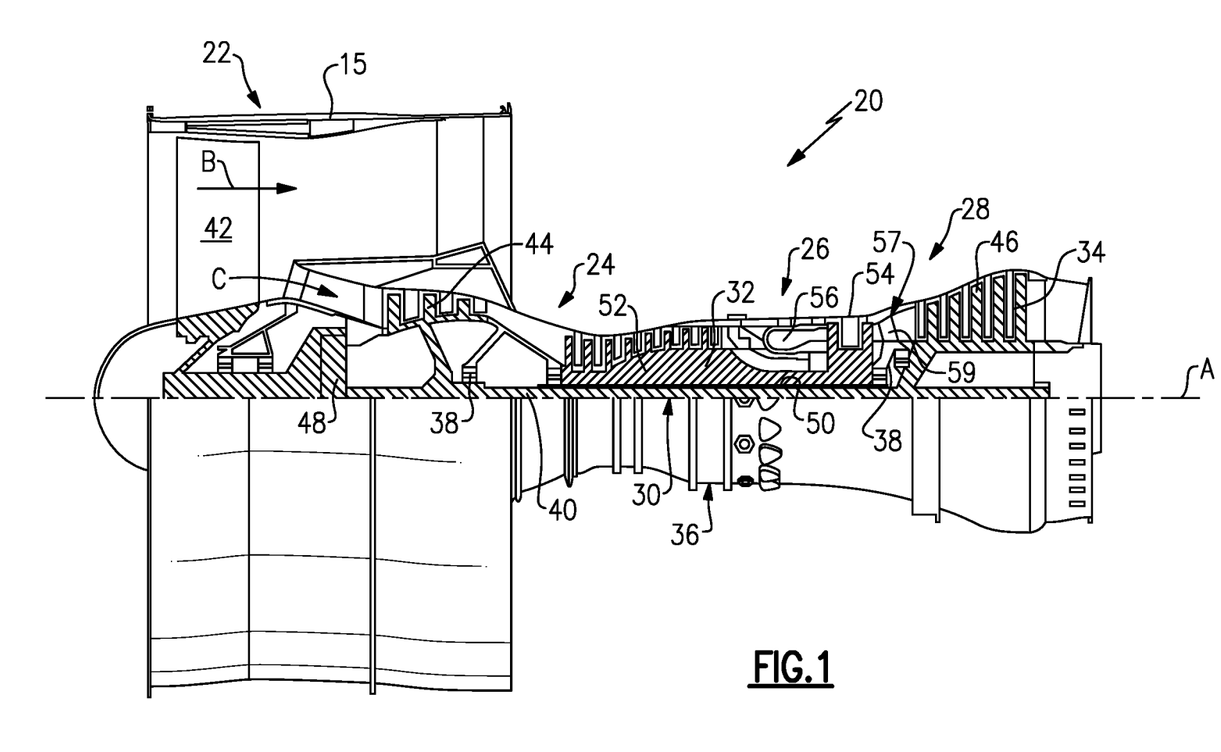
FIG. 1 schematically illustrates a gas turbine engine embodiment.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include an augmenter section (not shown) among other systems or features. The fan section 22 drives air along a bypass flow path B in a bypass duct defined within a nacelle 15, while the compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures. That is, the disclosed airfoils may be used for engine configurations such as, for example, direct fan drives, or two- or three-spool engines with a speed change mechanism coupling the fan with a compressor or a turbine sections.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a second (or high) pressure compressor 52 and a second (or high) pressure turbine 54. A combustor 56 is arranged in exemplary gas turbine 20 between the high pressure compressor 52 and the high pressure turbine 54. A mid-turbine frame 57 of the engine static structure 36 is arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis X which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five (5:1). Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicyclic gear train, such as a planetary gear system or other gear system, with a gear reduction ratio of greater than about 2.3:1. It should be understood, however, that the above parameters are only exemplary of one embodiment of a geared architecture engine and that the present invention is applicable to other gas turbine engines including direct drive turbofans.

The example gas turbine engine includes the fan 42 that comprises in one non-limiting embodiment less than about twenty-six (26) fan blades. In another non-limiting embodiment, the fan section 22 includes less than about twenty (20) fan blades. Moreover, in one disclosed embodiment the low pressure turbine 46 includes no more than about six (6)

turbine rotors schematically indicated at 34. In another non-limiting example embodiment the low pressure turbine 46 includes about three (3) turbine rotors. A ratio between the number of fan blades 42 and the number of low pressure turbine rotors is between about 3.3 and about 8.6. The example low pressure turbine 46 provides the driving power to rotate the fan section 22 and therefore the relationship between the number of turbine rotors 34 in the low pressure turbine 46 and the number of blades 42 in the fan section 22 disclose an example gas turbine engine 20 with increased power transfer efficiency.

A significant amount of thrust is provided by the bypass flow B due to the high bypass ratio. The fan section 22 of the engine 20 is designed for a particular flight condition—typically cruise at about 0.8 Mach and about 35,000 feet (10,668 meters). The flight condition of 0.8 Mach and 35,000 ft (10,668 meters), with the engine at its best fuel consumption—also known as "bucket cruise Thrust Specific Fuel Consumption ('TSFCT')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.55. In another non-limiting embodiment the low fan pressure ratio is less than about 1.45. In another non-limiting embodiment the low fan pressure ratio is from 1.1 to 1.45. "Low corrected fan tip speed" is the actual fan tip speed in ft/sec divided by an industry standard temperature correction of $[(Tram\ °R)/(518.7°\ R)]^{0.5}$. The "Low corrected fan tip speed" as disclosed herein according to one non-limiting embodiment is less than about 1200 ft/second (365.7 meters/second).

The example gas turbine engine includes the fan 42 that comprises in one non-limiting embodiment less than about twenty-six (26) fan blades. In another non-limiting embodiment, the fan section 22 includes less than about twenty (20) fan blades. Moreover, in one disclosed embodiment the low pressure turbine 46 includes no more than about six (6) turbine rotors schematically indicated at 34. In another non-limiting example embodiment the low pressure turbine 46 includes about three (3) turbine rotors. A ratio between the number of fan blades 42 and the number of low pressure turbine rotors is between about 3.3 and about 8.6. The example low pressure turbine 46 provides the driving power to rotate the fan section 22 and therefore the relationship between the number of turbine rotors 34 in the low pressure turbine 46 and the number of blades 42 in the fan section 22 disclose an example gas turbine engine 20 with increased power transfer efficiency.

Figure 2:
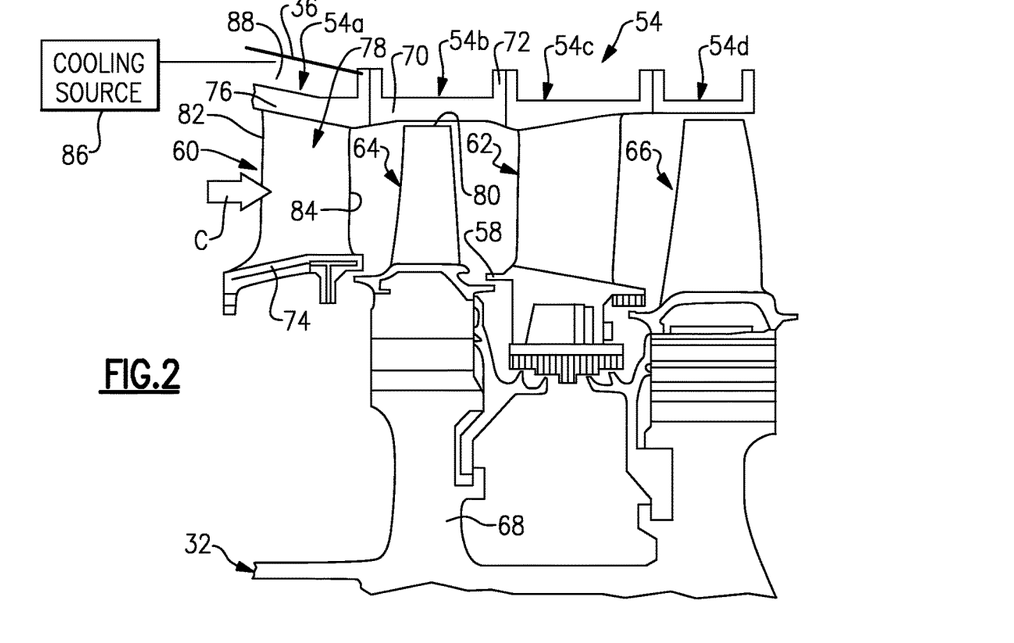
FIG. 2 is a cross-sectional view through a high pressure turbine section.

Referring to FIG. 2, a cross-sectional view through a high pressure turbine section 54 is illustrated. It should be understood that the disclosed vane may be used anywhere in the compressor section and/or the turbine section. In the example high pressure turbine section 54, first and second arrays 54a, 54c of circumferentially spaced fixed vanes 60, 62 are axially spaced apart from one another. A first stage array 54b of circumferentially spaced turbine blades 64, mounted to a rotor disk 68, is arranged axially between the first and second fixed vane arrays 54a, 54c. A second stage array 54d of circumferentially spaced turbine blades 66 is arranged aft of the second array 54c of fixed vanes 62.

The turbine blades each include a tip 80 adjacent to a blade outer air seal 70 of a case structure 72. The first and second stage arrays 54a, 54c of turbine vanes and first and second stage arrays 54b, 54d of turbine blades are arranged within a core flow path C and are operatively connected to a spool 32.

In the example, each vane 60 includes an inner platform 74 and an outer platform 76 respectively defining inner and outer flow paths. The platforms 74, 76 are interconnected by an airfoil 78 extending in a radial direction. It should be understood that the turbine vanes may be discrete from one another or arranged in integrated clusters. The airfoil 78 provides leading and trailing edges 82, 84.

The airfoil 78 is provided between pressure (generally concave) and suction (generally convex) sides in an airfoil thickness direction, which is generally perpendicular to a chord-wise direction provided between the leading and trailing edges 82, 84. Multiple turbine vanes 60 are arranged circumferentially in a circumferential direction. The airfoil 78 typically includes multiple film cooling holes (not shown).

In one example, the first stage array 54a consists of 32 turbine vanes 60, but the number may vary according to engine size. The turbine vanes 60 are constructed from a high strength, heat resistant material such as a nickel-based or cobalt-based superalloy, or of a high temperature, stress resistant ceramic or composite material. In cooled configurations, internal fluid passages and external cooling apertures provide for a combination of impingement and film cooling. Other cooling approaches may be used such as trip strips, pedestals or other convective cooling techniques. In addition, one or more thermal barrier coatings, abrasion-resistant coatings or other protective coatings may be applied to the turbine vane 60.

Referring to FIG. 2, a cooling cavity 88 is arranged between the engine static structure 36 and the vane 60. A cooling source 86, such as bleed air from the compressor section, provides a cooling fluid to the cavity 88. Although the cavity 88 is illustrated as being arranged at the outer platform 76, it should be understood that the cavity may also be positioned at the inner platform 74.

Figure 3A:
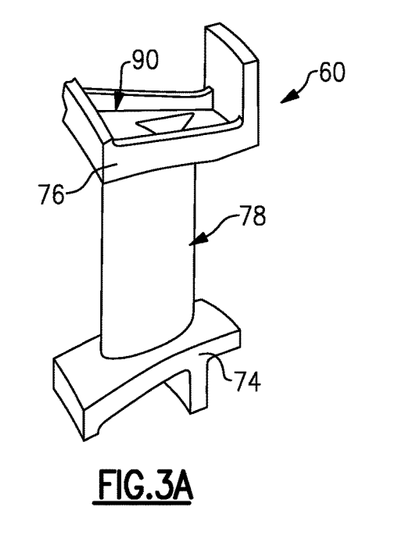
FIG. 3A is a perspective view of a turbine vane for the high pressure turbine section shown in FIG. 2, without an impingement plate.
Figure 3B:
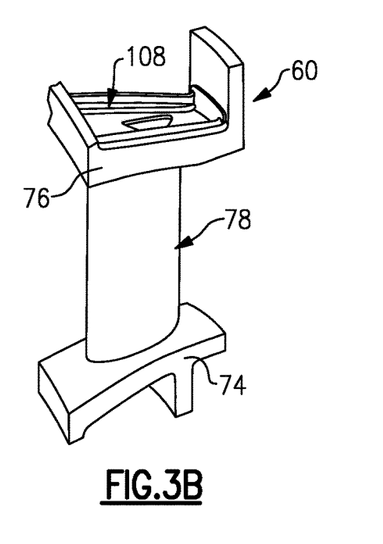
FIG. 3B is a perspective view of a turbine vane for the high pressure turbine section shown in FIG. 2, with an impingement plate.

The airfoil 78 extends from a first side of the outer platform 76. Referring to FIGS. 3A and 3B, the vane 60 includes a platform pocket 90 in a second side of the platform, for example, the outer platform 76. An impingement plate 108 is secured to the outer platform 76 over the pocket 90 to enhance the cooling of the outer platform 76 during engine operation.

Figure 4A:
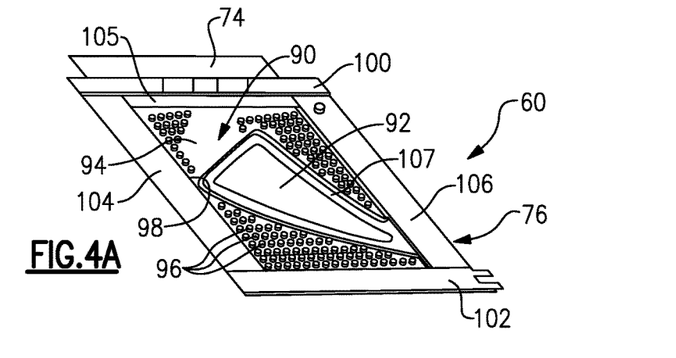
FIG. 4A is a top elevational view of a platform and its associated pocket.
Figure 4B:
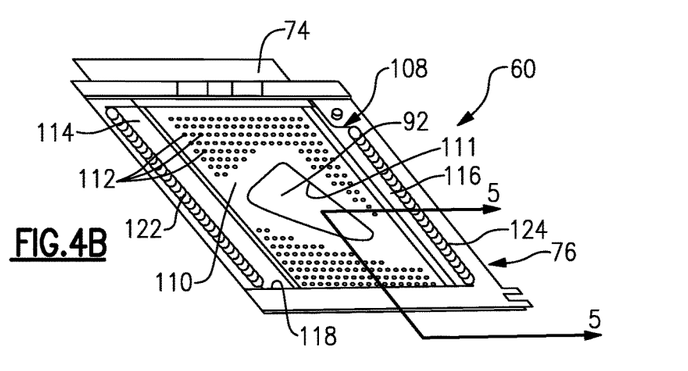
FIG. 4B is a top elevational view of an impingement plate secured to the platform over the pocket.
Figure 5:
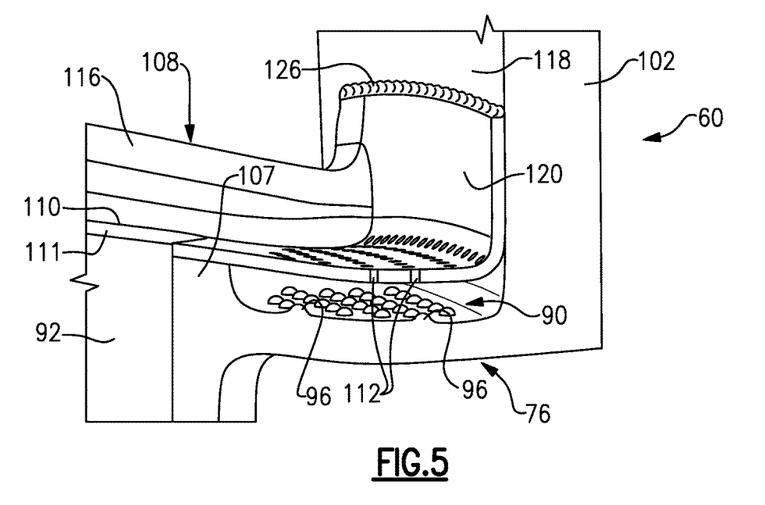
FIG. 5 is an enlarged perspective view taken along line 5-5 of FIG. 4B.

Referring to FIGS. 4A-5, a face 94 of the outer platform 76 includes multiple protrusions 96 that extend into the platform pocket, which enhances cooling of the outer platform 76. The pocket 90 is defined by a perimeter 98 provided by forward and aft rails 100, 102 and lateral walls 104, 106. The impingement plate 108 is secured to the outer platform 76 over the pocket 90 to at least one of the forward and aft rails 100, 102 and/or the lateral walls 104, 106 by one or more weld beads, for example.

The impingement plate 108 includes a cooling wall 110 that has multiple cooling holes 112, best shown in FIG. 4B. The cavity 88 fills with cooling fluid, which passes through the cooling holes 112 to impinge upon the face 94 and its associated protrusions 96.

The face 94 includes a ridge 107 that extends radially outward to circumscribe the cooling passage 92. The impingement plate 108 includes an opening 111, which surrounds the cooling passage 92 and seals against the ridge 107. The cavity 88 is in fluid communication with the cooling passage 92 to provide cooling fluid to the airfoil 78.

The impingement plate 108 includes lateral flanges 114, 116 that respectively engage the lateral walls 104, 106. The cooling wall 110 engages a recessed wall 105 that is recessed with respect to the adjacent lateral walls 104, 106 and the forward rail 100. The lateral flanges 114, 116 are parallel to the cooling wall 110.

The aft rail 102 includes a radial surface 118, and the impingement plate 108 includes a radial flange 120 that extends radially and engages the radial surface 118. The radial flange 120 is generally perpendicular to the cooling wall 110. In the example, the impingement plate 108 is unsupported immediately beneath the radial flange 120 in the radial direction, eliminating the prior art shoulder in this area. This arrangement may also be provided at the forward rail, if desired.

Welds 122, 124, 126 respectively secure the lateral flanges 114, 116 and radial flange 120 to the lateral walls 104, 106 and aft rail 102. More or fewer welds may be used than illustrated. For example, a weld bead may be provided at the opening 111 and about the outer perimeter of the impingement plate 108 to entirely seal the pocket 90 (except the cooling holes 112).

Figure 6:
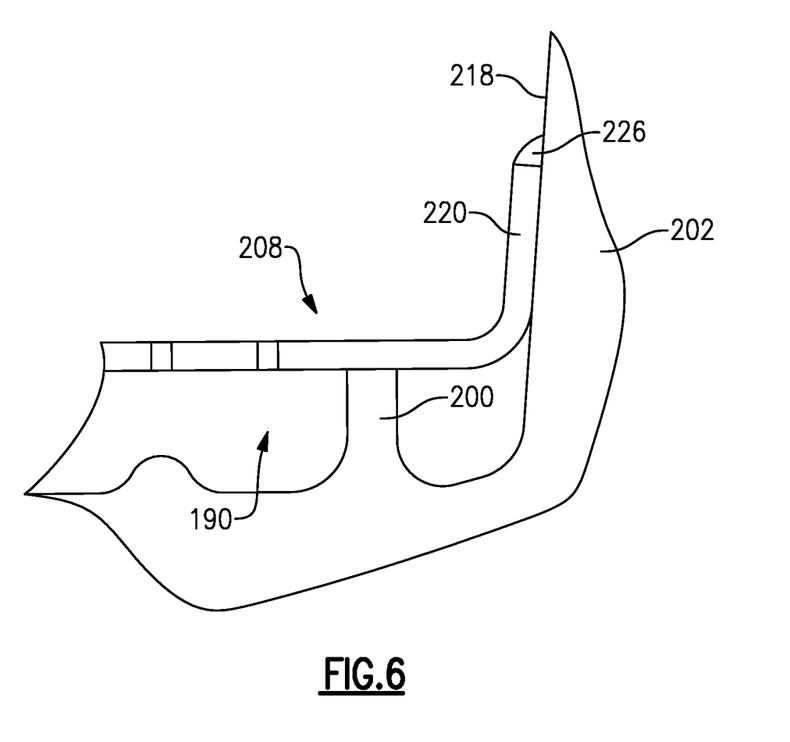
FIG. 6 is a cross-sectional view taken along line 5-5 of FIG. 4B illustrating another embodiment.

Referring to FIG. 6, the impingement plate 208 is arranged over the pocket 190. A portion of the impingement plate 208 is supported by a pedestal 200 arranged near the radial flange 220. The radial flange 220 engages a radial surface 218 of the aft rail 202. If desired, a weld 226 can be used to secure the radial flange 220 to the radial surface 218. The pedestal 220 sets the height of the impingement plate 208 without significantly impacting the cooled area of the pocket 190.

The disclosed vane removes the shoulder adjacent to the forward or aft rail and has the impingement plate mate to the vertical (radial) face of the rail. This is accomplished by introducing a bend in the sheet metal that follows the transition from the lateral walls around the platform pocket up the face of the vertical rail. This construction enlarges the pocket to increase impingement cooling, minimizing uncooled mass adjacent to the rails.

It should also be understood that although a particular component arrangement is disclosed in the illustrated embodiment, other arrangements will benefit herefrom. Although particular step sequences are shown, described, and claimed, it should be understood that steps may be performed in any order, separated or combined unless otherwise indicated and will still benefit from the present invention.

Although the different examples have specific components shown in the illustrations, embodiments of this invention are not limited to those particular combinations. It is possible to use some of the components or features from one of the examples in combination with features or components from another one of the examples.

Although an example embodiment has been disclosed, a worker of ordinary skill in this art would recognize that certain modifications would come within the scope of the claims. For that reason, the following claims should be studied to determine their true scope and content.

What is claimed is:

1. A stator vane for a gas turbine engine comprising:
an airfoil extending radially from a first side of a platform, a pocket provided in the platform on a second side opposite the airfoil, forward and aft rails extending from the second side of the platform, one of the forward and aft rails including a radial surface, and the other of the forward and aft rails having a wall extending axially therefrom, wherein the airfoil includes a cooling passage that extends through the airfoil to the second side; and
an impingement plate secured to the platform over the pocket, the impingement plate including a radial flange engaging the radial surface, and the impingement plate having a side opposite the radial flange that engages the wall, the impingement plate includes an opening aligned with the cooling passage to provide fluid communication from the cooling passage through the opening, the second side includes a ridge circumscribing the cooling passage and engaging the impingement plate near the opening, the impingement plate is unsupported immediately beneath the radial flange in the radial direction, the impingement plate is supported by at least one pedestal near the radial flange in the radial direction, wherein the at least one pedestal is different than the ridge and is spaced from both the forward and aft rails, wherein the second side includes multiple protrusions arranged beneath multiple cooling holes, the protrusions are spaced from the ridge and spaced radially from the impingement plate.

2. The stator vane according to claim 1, wherein the pocket is circumscribed by a perimeter, the perimeter provided by the forward and aft rails and spaced apart lateral walls joining the forward and aft rails, wherein the wall is recessed relative to the lateral walls.

3. The stator vane according to claim 2, wherein the second side includes the recessed wall adjoining the lateral walls and the other of the forward and aft rails, the impingement plate engaging the recessed wall.

4. The stator vane according to claim 2, wherein the impingement plate includes lateral flanges engaging the lateral walls.

5. The stator vane according to claim 4, wherein the lateral flanges are welded to the lateral walls.

6. The stator vane according to claim 4, wherein the radial flange is generally perpendicular to the lateral flanges.

7. The stator vane according to claim 1, wherein the impingement plate includes a cooling surface that provides the opening, and the multiple cooling holes face the second side.

8. The stator vane according to claim 1, wherein the radial flange is welded to the radial surface.

9. The stator vane according to claim 1, wherein the radial surface is provided on the aft rail.

10. The stator vane according to claim 1, comprising inner and outer platforms joined by the airfoil, wherein the platform is the outer platform.

11. The stator vane according to claim 10, wherein the stator vane is a turbine vane.

12. A gas turbine engine comprising:
an engine static structure;
compressor and turbine sections, one of the compressor and turbine sections including a stator vane arranged in the one of the compressor and turbine sections, an airfoil extending radially from a first side of a platform, a pocket provided in the platform on a second side opposite the airfoil, the pocket is in fluid communication with a cavity provided between the platform and the engine static structure, forward and aft rails extending from the second side of the platform, one of the forward and aft rails including a radial surface, and the other of the forward and aft rails having a wall extending axially therefrom, wherein the airfoil includes a cooling passage that extends through the airfoil to the second side; and an impingement plate secured to the platform over the pocket, and the impingement plate includes an opening aligned with the cooling passage to provide fluid communication between the cavity and the cooling passage, the impingement plate including a radial flange engaging the radial surface, and the impingement plate having a side opposite the radial flange that engages the wall, the impingement plate includes an opening aligned with the cooling passage to provide fluid communication from the cooling passage through the opening, the second side includes a ridge circumscribing the cooling passage and engaging the impingement plate near the opening, the impingement plate is unsupported immediately beneath the radial flange in the radial direction, the impingement plate is supported by at least one pedestal near the radial flange in the radial direction, wherein the at least one pedestal is different than the ridge and is spaced from both the forward and aft rails, wherein the second side includes multiple protrusions arranged beneath multiple cooling holes, the protrusions are spaced from the ridge and spaced radially from the impingement plate.

13. The gas turbine engine according to claim 12, wherein the pocket is circumscribed by a perimeter, the perimeter provided by the forward and aft rails and spaced apart lateral walls joining the forward and aft rails, wherein the wall is recessed relative to the lateral walls, the second side includes the recessed wall adjoining the lateral walls and the other of the forward and aft rails, the impingement plate engaging the recessed wall, the impingement plate includes lateral flanges engaging the lateral walls.

14. The gas turbine engine according to claim 13, wherein either the lateral flanges are welded to the lateral walls or the radial flange is welded to the radial surface.

15. The gas turbine engine according to claim 12, wherein the stator vane is a turbine vane, comprising inner and outer platforms joined by the airfoil, wherein the platform is the outer platform.

\* \* \* \* \*